United States Patent
Lange

(10) Patent No.: US 9,625,569 B2
(45) Date of Patent: Apr. 18, 2017

(54) TIME-OF-FLIGHT CAMERA WITH MOTION DETECTION

(71) Applicant: PMDTECHNOLOGIES GMBH, Siegen (DE)

(72) Inventor: Robert Lange, Netphen (DE)

(73) Assignee: PMDTECHNOLOGIES AG (DE)

( * ) Notice: Subject to any disclaimer, the term of this patent is extended or adjusted under 35 U.S.C. 154(b) by 6 days.

(21) Appl. No.: 14/652,132

(22) PCT Filed: Dec. 11, 2013

(86) PCT No.: PCT/EP2013/076295
§ 371 (c)(1),
(2) Date: Jun. 15, 2015

(87) PCT Pub. No.: WO2014/095539
PCT Pub. Date: Jun. 26, 2014

(65) Prior Publication Data
US 2015/0338509 A1    Nov. 26, 2015

(30) Foreign Application Priority Data

Dec. 17, 2012 (DE) .......................... 10 2012 223 451

(51) Int. Cl.
*G01S 7/48* (2006.01)
*G01S 17/08* (2006.01)
(Continued)

(52) U.S. Cl.
CPC ............ *G01S 7/4802* (2013.01); *G01S 17/08* (2013.01); *G01S 17/36* (2013.01); *G01S 17/89* (2013.01)

(58) Field of Classification Search
CPC . G01S 17/89; G01S 17/00; G01S 7/48; G01S 7/486
See application file for complete search history.

(56) References Cited

U.S. PATENT DOCUMENTS

| 6,448,572 B1 * | 9/2002 | Tennant | G01S 7/4863 250/559.38 |
| 6,587,186 B2 | 7/2003 | Bamji et al. | |
| 2012/0242975 A1 | 9/2012 | Min et al. | |

FOREIGN PATENT DOCUMENTS

| DE | 19704496 C2 | 2/2001 |
| DE | 102005045484 A1 | 2/2007 |

(Continued)

OTHER PUBLICATIONS

Stephan Hussmann et al: "Real-time motion supression in TOF range images", Instrumentation and Measurement Technology Conference (I2MTC). 2010 IEEE. IEEE. Piscataway. NJ. USA. May 3, 2010 (May 3, 2010). pp. 697-701.

(Continued)

*Primary Examiner* — Luke Ratcliffe
(74) *Attorney, Agent, or Firm* — Schmeiser, Olsen & Watts, LLP

(57) ABSTRACT

A method for operating a time-of-flight camera including a time-of-flight sensor comprising an array of time-of-flight pixels with at least two integration nodes, wherein in a 3D mode the time-of-flight sensor and an illumination means are operated by means of a modulation signal and on the basis of the charges accumulated at the integration nodes distance values are determined, characterized in that in a power saving mode the time-of-flight sensor is operated with a control signal for motion detection, the frequency of which is lower than a lowest frequency of the modulation signal for a distance determination in the 3D mode, wherein an object motion is determined based on a differential value at the integration nodes is provided.

7 Claims, 6 Drawing Sheets

(51) Int. Cl.
 G01S 17/36 (2006.01)
 G01S 17/89 (2006.01)

(56) References Cited

FOREIGN PATENT DOCUMENTS

DE 102011089629 A1 6/2012
EP 17777747 B1 3/2008
WO WO2004021546 A2 3/2004

OTHER PUBLICATIONS

International Search Report; PCT/EP2013/076295; International Filing Date: Dec. 11, 2013, DE Application No. 10 2012 223 451.9; 4 pgs.

\* cited by examiner

No Movement

Movement

TIME-OF-FLIGHT CAMERA WITH MOTION DETECTION

CROSS-REFERENCE TO RELATED APPLICATIONS

This application claims priority to PCT Application No. PCT/EP2013/076295, having a filing date of Dec. 11, 2013, based on DE 10 2012 223 451.9, having a filing date of Dec. 17, 2012, the entire contents of which are hereby incorporated by reference.

FIELD OF TECHNOLOGY

The following relates to a time-of-flight camera with motion detection and a corresponding method.

BACKGROUND

Time-of-flight cameras in particular refer to time-of-flight camera systems or TOF-camera systems which derive time-of-flight information from a phase shift of emitted and received radiation. As time-of-flight or TOF-cameras in particular PMD-cameras comprising photo mixing detectors (PMDs) are adapted such as described inter alia in the patent applications EP 1777747 B1, U.S. Pat. No. 6,587,186 B2 and DE 197 04496 C2 and available, for example, from 'ifm electronic GmbH' or 'PMD-Technologies GmbH' as Frame-Grabber O3D and CamCube or PMD[Vision] CamBoard-Nano, respectively. The PMD-camera in particular enables a flexible arrangement of the light source and the detector which can be positioned in one housing as well as separately.

SUMMARY

An aspect relates to improving the application areas of a time-of-flight camera in terms of monitoring tasks.

Particularly preferred a method of operating a time-of-flight camera comprising a time-of-flight sensor is provided which comprises an array of time-of-flight pixels with at least two integration nodes, wherein in a 3D mode the time-of-flight sensor and an illumination means are operated by means of a modulation signal and on the basis of the charges accumulated at the integration nodes distance values are determined, wherein in a power saving mode the time-of-flight sensor is preferably operated independently from the illumination means by means of a control signal for motion detection, the frequency of which is lower than a lowest frequency of the modulation signal for a distance determination in the 3D mode, and wherein an object motion is determined based on a differential value at the integration nodes.

This approach has the advantage that the time-of-flight camera can be operated in different detection modes with a single sensor. In addition to the pure distance measurement, it is possible to detect a movement of a moving object in a power saving mode solely on the basis of differences in brightness which the moving object produces.

It is preferably provided that in the power saving mode the differential value is compared with a threshold value and, if the threshold value is exceeded, this is identified as an object motion.

This approach has the advantage that the motion detection is reduced mainly to the evaluation of a differential value and no additional image analysis is required.

In particular it is an advantage that it is switched from the power saving mode into the 3D mode as soon as an object motion is detected in a power saving mode.

Herein, the power saving mode can in particular be configured such that the illumination means of the time-of-flight camera is deactivated and the motion detection is performed only on the basis of the existing ambient light. Furthermore, it is also conceivable that in the power saving mode the illumination means is operated at a lower power than in the 3D mode. Moreover, the illumination means must not necessarily be modulated in the power saving mode, but can be operated with constant light. If the illumination means is to be further modulated during the power saving mode it is advantageous when the modulation frequency of the illumination means is substantially higher than the frequency of the control signal by means of which the time-of-flight sensor is operated.

Preferably, in the power saving mode the frequency of the control signal is less than 10% of the minimum frequency of the modulation signal for the distance determination in the 3D mode. This approach has on the one hand the advantage that the illumination means, if operated with a modulation frequency corresponding to a 3D mode, does not further disturb the separation of the brightness signal into the two A- and B-channels. On the other hand larger signal differences between the two integration nodes in case of a brightness change result from lower clock frequencies of the control signal.

In a preferred embodiment it is provided that in the power saving mode a differential value at a rate of less than 200 Hz and in particular less than 50 Hz is detected. Thus, by lowering the detection rate more power can be saved if the application permits. In certain applications with low requirements even detection rates of 1 Hz or even lower are conceivable.

It is also advantageous to form a time-of-flight camera for performing one of the abovementioned methods.

BRIEF DESCRIPTION

Some of the embodiments will be described in detail, with reference to the following figures, wherein like designations denote like members, wherein.

DETAILED DESCRIPTION

Figure 1:
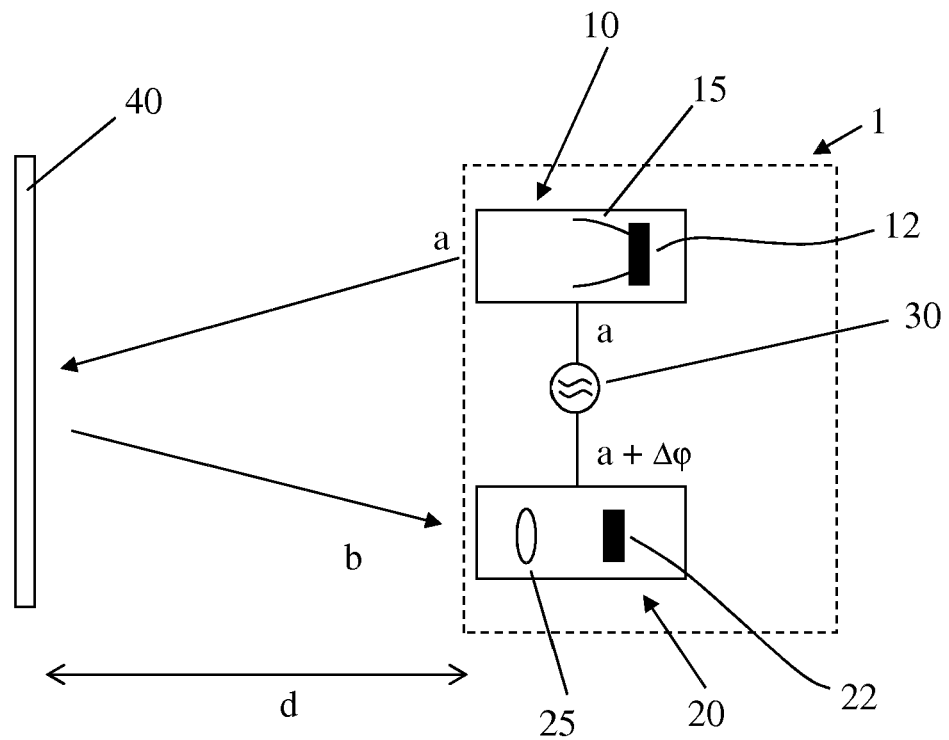
FIG. 1 shows a time-of-flight camera system.

In the following description of the preferred embodiments like reference numerals refer to like or comparable components.

FIG. 1 shows a measuring situation for an optical distance measurement using a time-of-flight camera as known, for example, from DE 19704496 C2.

The time-of-flight camera system 1 comprises a transmission unit or an illumination module 10 comprising an illumination light source 12 and an associated beam shaping optics 15 as well as a receiving unit, a time-of-flight or TOF camera 20 including a receiving optics 25 and a time-of-flight sensor 22. The time-of-flight sensor 22 comprises an array of time-of-flight pixels and is in particular configured as a PMD sensor. The receiving optics 25 typically consists of several optical elements for improving the imaging characteristics. The beam shaping optics 15 of the transmission unit 10 is preferably configured as a reflector. However, diffractive elements or combinations of reflective and diffractive elements can be used, too.

The measuring principle of this arrangement is essentially based on that the time-of-flight of the emitted and reflected light can be determined based on the phase shift of the emitted and received light. For this purpose, a certain modulation frequency or modulation signal having a first phase position a is supplied both to the light source 12 and the time-of-flight sensor 22 via a modulator 30. According to the modulation frequency the light source 12 transmits an amplitude-modulated signal with the phase a. In the demonstrated case this signal or the electromagnetic radiation is reflected from an object 40 and impinges onto the time-of-flight sensor 22 with a corresponding phase shift caused by the travel distance at a second phase position b. In the time-of-flight sensor 22 the signal of the first phase position a of the modulator 30 is mixed with the received signal comprising the second phase position b resulting from the time-of-flight, wherein the phase shift or the object distance d is determined from the resulting signal.

For a more precise determination of the second phase position b and hence the object distance d it may be provided to change the phase position a with which the time-of-flight sensor 22 is operated by a predetermined phase shift $\Delta\phi$. Likewise it can be provided to specifically shift the phase with which the illumination means is driven.

Figure 2:
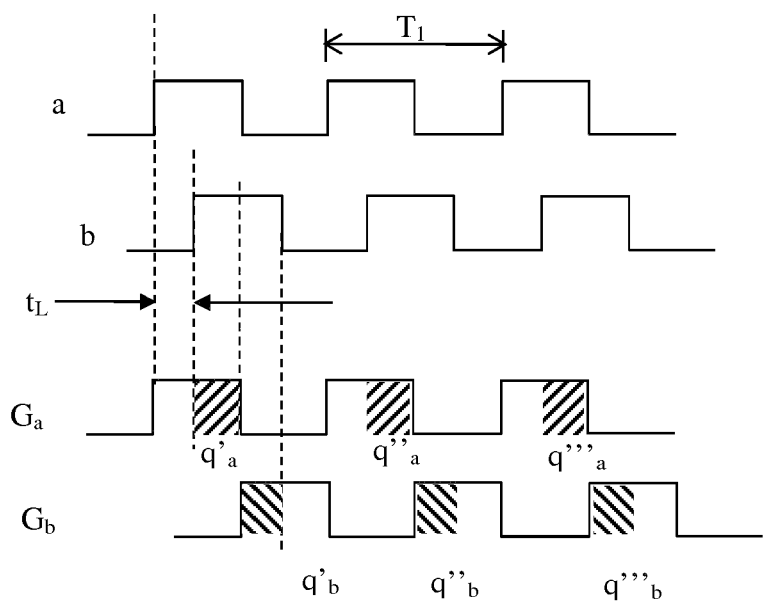
FIG. 2 shows a modulated integration of photonically generated charge carriers.

The principle of the phase measurement is schematically illustrated in FIG. 2. The upper curve shows the time dependent waveform of the modulation signal with which the illumination means 12 and the time-of-flight sensor 22, here without phase shift, are driven. The light b reflected from the object 40 according to its time-of-flight $t_L$ impinges onto the time-of-flight sensor 22 with a phase shift. The time-of-flight sensor 22 accumulates the photonically generated charges q in a first integration node Ga during the first half of the modulation period and in a second integration node Gb during the second half of the modulation period. The charges are typically accumulated or integrated over several modulation periods. From the ratio of the charges qa, qb accumulated in the first and second integration node Ga, Gb the phase shift and thus a distance of the object can be determined.

As already known from DE 19704496 C2 the phase shift of the light reflected from the object and thus the distance may be determined for example by a so-called IQ (inphase quadrature) method. For determining the distance preferably two measurements are performed with phase positions of the modulation signal shifted by 90°, for example $\phi_{mod}+\phi_0$ and $\phi_{mod}+\phi_{90}$, wherein from the charge difference $\Delta q$ (0°), $\Delta q$ (90°) determined in these phase positions the phase shift of the reflected light can be determined according to the known arctan relationship.

$$\varphi = \arctan \frac{\Delta q(90°)}{\Delta q(0°)}$$

In order to improve the accuracy further measurements may be performed with phase positions shifted for example by 180°.

$$\varphi = \arctan \frac{\Delta q(90°) - \Delta q(270°)}{\Delta q(0°) - \Delta q(180°)}$$

Of course, measurements with more than four phases and their multiples and a correspondingly adapted evaluation are conceivable.

Figure 3:
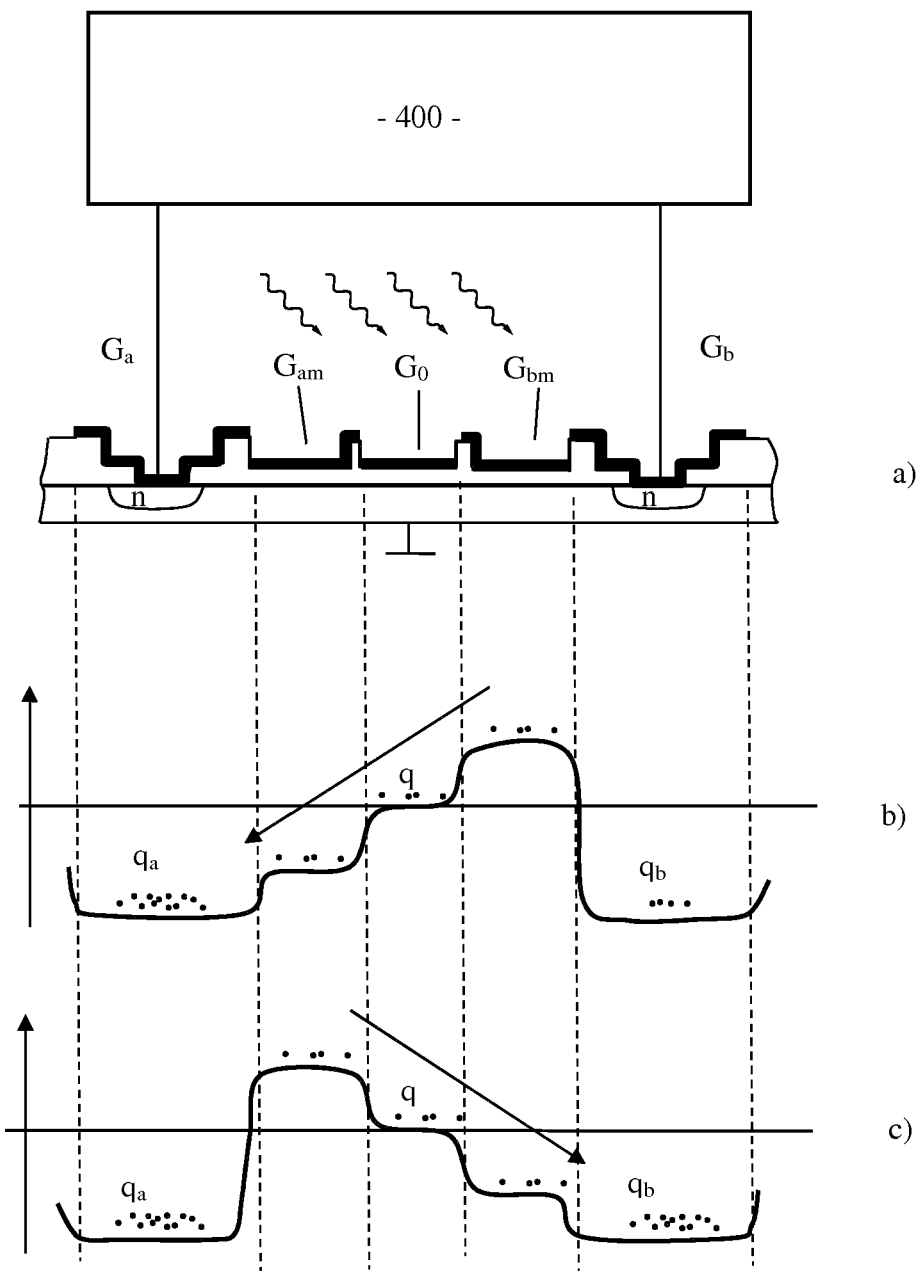
FIG. 3 shows a cross section of a PMD pixel.

FIG. 3 shows a cross section through a pixel of a photo mixing detector such as known from DE 19704496 C2. The modulation photo gates Gam, G0, Gbm form the light-sensitive area of a PMD pixel. According to the voltage applied to the modulation gates Gam, G0, Gbm the photonically generated charges q are directed to one of the accumulation gates or integration nodes Ga, Gb.

FIG. 3b shows a potential profile in which the charges q flow toward the first integration node Ga, while according to the potential according to FIG. 3c the charge q flows toward the second integration node Gb. The potentials are given according to the applied modulation signals. Depending on the case of application the modulation frequencies are preferably in a range of 1 to 100 MHz. A modulation frequency of, for example, 1 MHz results in a period of one microsecond, so that the modulation potential accordingly changes every 500 nanoseconds.

FIG. 3a further shows a readout unit 400 which may be part of a PMD time-of-flight sensor formed as a CMOS component. The integration nodes Ga, Gb formed as capacitances or diodes integrate the photonically generated charges over a plurality of modulation periods. Then, in a known manner the voltage provided at the gates Ga, Gb can be tapped, for example, via the readout unit 400 at a high impedance. The integration times are preferably selected such that for the expected light quantity the time-of-flight sensor or the integration nodes and/or the light-sensitive areas do not go into saturation.

In addition, further time-of-flight principles are known in which, for example, the photosensitive regions are provided with a shutter and the time-of-flight is determined by the charge carriers accumulated within the integration time predetermined by the shutter.

These TOF sensors are characterized by the following similarities: 1. The sensors comprise light-sensitive and light-insensitive areas. 2. The sensors include devices that shift an optically generated signal from the light-sensitive area to different (one, two or more) memory areas by means an electrical control variable, such as a current, a voltage or a charge. 3. If necessary, said signals derived can be already further processed during or after buffering. One example is the generation of a difference by means of a SBI (suppression of background illumination) circuit in PMD sensors.

In general, such demodulation sensors are used for TOF 3D distance measurements, however, other applications such as fluorescence lifetime microscopy (FLIM) are conceivable. In any case, the sensor will be used (similar to a lock-in amplifier) in order to determine an optical signal of a certain frequency in amplitude and phase.

Figure 4:
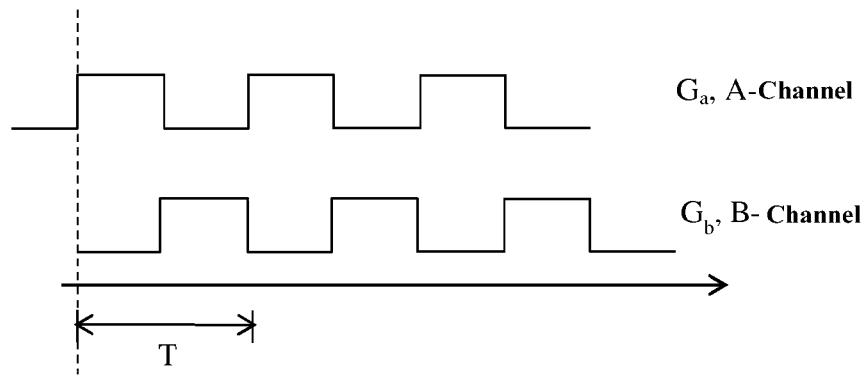
FIG. 4 shows a time control of a time-of-flight camera system.

FIG. 4 shows a typical timing for TOF sensors in general and in particular for a PMD sensor according to FIG. 2. Here, it is considered that the charge signals are separated into an A and B channel according to the integration nodes Ga, Gb. The modulation of the two channels A, B is carried out with a 180° phase shift. For typical modulation frequencies between 100 MHz and 20 MHz the period of the modulation is between 10 ns and 50 ns.

Figure 5:
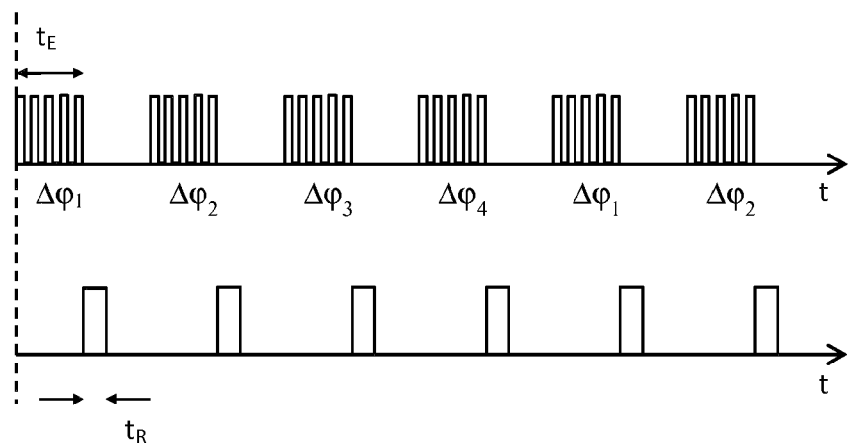
FIG. 5 shows a typical operation of a TOF sensor.

FIG. 5 shows a typical operation of a TOF sensor in which the integration nodes are read out in a measuring pause between the TOF distance measurements. The upper curve shows schematically a plurality of modulation sections in which the illumination means is operated with different phase positions $\Delta\phi_i$ and the TOF sensor accumulates or demodulates the photonically generated charge carriers in A and B channels or in the corresponding integration nodes Ga, Gb.

Depending on the case of application the time $t_E$ of the modulation sections or distance measurements may vary, for example, between 200 μs and 10 ms. The integration nodes Ga, Gb are read out within the measuring pauses, wherein the readout time $t_R$ varies, for example, between 500 μs and 1 ms.

For capturing a 3D image at least two differential phase images—A channel minus B channel—are required. Typically, however, four phase images with different phase position $\Delta\phi_i$ are captured.

According to embodiments of the present invention, however, it is provided to drive time-of-flight sensors in a different operating mode, for example, to be able to save power and in particular to provide a standby mode for a monitoring task. The separating feature of the time-of-flight pixel is used to capture differential images of the scene. This is achieved in the simplest case by integrating to the nodes A during the first half of the image capturing process and to the nodes B in the second half of the image capturing process. This approach is not necessarily limited to a PMD sensor, but is generally also applicable to other TOF sensors. Moreover, the principle can be used in sensors including more than two memory/acquisition nodes.

In particular, it is advantageous that the method according to embodiments of the invention can be carried out independent from the illumination of the time-of-flight camera system. If the environment is sufficiently bright no additional light is required for the motion detection according to embodiments of the invention. If necessary, the illumination means 22 of the time-of-flight camera system can be additionally activated.

Figure 6:
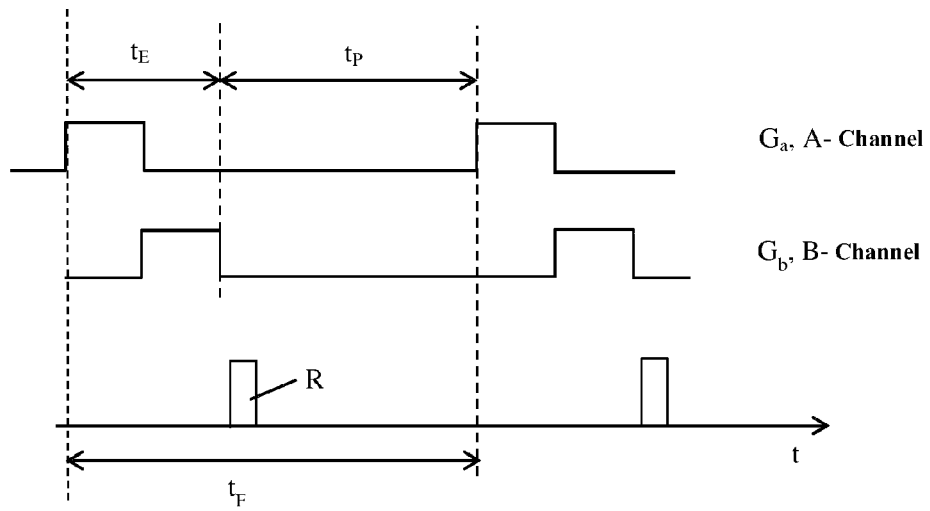
FIG. 6 shows a time control of a time-of-flight sensor for motion detection.

FIG. 6 shows a superordinated timing, a modulation control and readout of several captured differential images. In contrast to the high-frequency control of the A and B nodes, in the illustrated case the A and B nodes are each activated only once within a acquisition time $t_E$ for the pure image acquisition. Then the two nodes are read out after the acquisition time $t_E$ (read/readout R) and compared with each other or a differential value A–B is generated.

The acquisition time $t_E$ can be changed depending on the present light intensity, if required. It also can be provided to vary the length of the acquisition time $t_E$ in successive acquisition cycles. Preferably, an acquisition time $t_E$ is used, which is longer than 1 ms. The pause periods $t_P$ between the acquisition periods can be adjusted depending on the application. For example, if a motion detection at a frame rate or scan rate of 20 Hz is desired, for example, an acquisition time $t_E$ of 10 ms and a pause period $t_P$ of 40 ms could be chosen so that in total every 50 ms, i.e. with a frequency of 20 Hz, a differential image can be acquired.

In the power saving mode, the time-of flight sensor is thus not controlled with the usual high-frequency modulation signal, but with a low-frequency control signal or switching signal, herein in the example shown each gate Ga, Gb is triggered only once within an acquisition period $t_E$.

During the acquisition time $t_E$ for the first half acquisition time $t_E/2$, a control signal or potential is provided at the first gate Ga, and in the second half $t_E/2$ a control signal is provided at the second gate Gb, so that the charges q photonically generated in the light-sensitive area of the time-of-flight sensor 22 in the first half of the acquisition time flow to the first gate or integration node Ga and in the second half to the second integration node Gb and are accumulated there. In the following pause time $t_P$ the charges accumulated at the both gates Ga, Gb are read out R and a charge difference $\Delta q$ or a corresponding electrical quantity $\Delta U$, $\Delta I$ is determined. The frame rate $1/t_F$ or the frame length $t_F$ results from the sum of the acquisition time $t_E$ and the pause time $t_P$.

Figure 7:
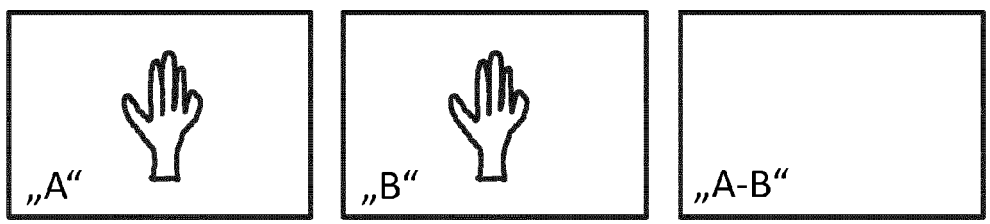
FIG. 7 shows examples of possible channel and differential images.
Figure 7:
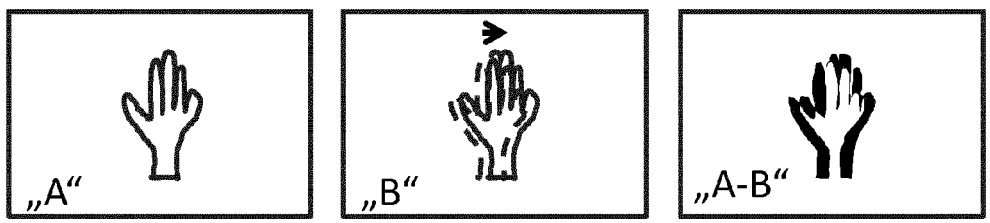

The basic idea of motion detection on the basis of differential values is exemplarily explained with reference to a moving and stationary hand in FIG. 7. If no motion is present in the scene to be imaged the images of the nodes A and B are identical. The difference, neglecting all noise magnitudes, results in zero. If during the image acquisition a motion is present another image is stored in the A nodes or A memories of the pixels which is different from that in the B nodes or B memories. The difference "A–B" results in a differential image which is different from "zero".

"Another image" means with respect to a single time-of-flight pixel that, when the object moves the object brightness and thus the luminous flux and the quantity of photonically generated charge carriers vary within the pixel. If the object does not move the object brightness remains constant. Thus, the symmetrically driven integration nodes Ga, Gb accumulate the same number of charge carriers and the differential value between the two integration node Ga, Gb is zero. For a moving object the brightness values change so that the symmetrically driven integration nodes Ga, Gb accumulate different quantities of charge and the differential value is not equal to zero.

Figure 8:
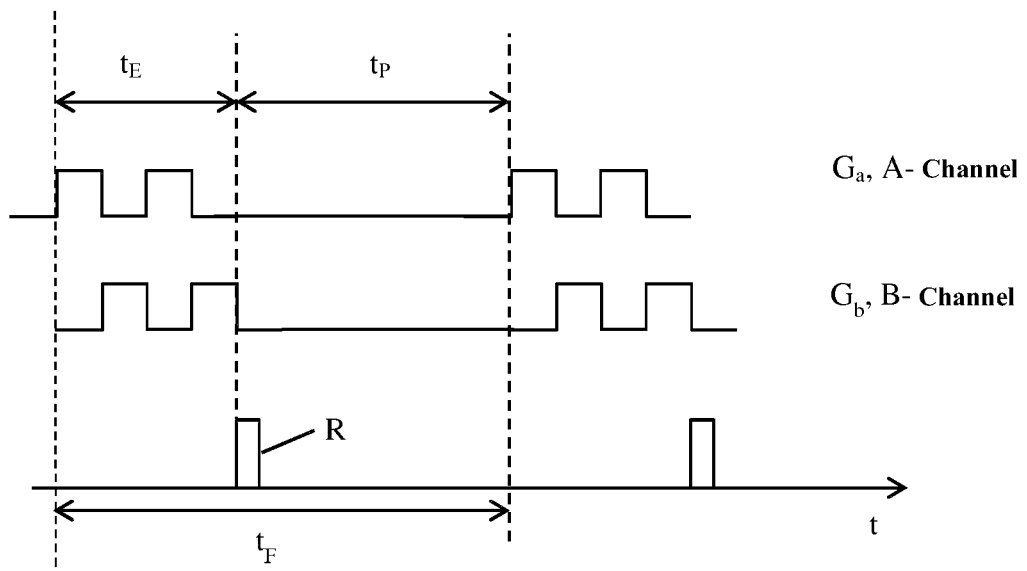
FIG. 8 shows a control with two clocks per channel.

The detection of changes in brightness basically works even if the charge integration changes several times between the integration nodes Ga, Gb within the acquisition time, as exemplarily shown in FIG. 8. With increasing clock rate or frequency of the control signal, however, as a result the difference in charges between the two integration nodes decreases, so that the clock frequency of the control signal preferably should remain smaller in the power saving mode than the modulation frequency in the 3D mode.

If the differential image or the differential values are greater than an application specific threshold value, this is detected as a motion. For evaluation, for example, all detected differential values, which may be present as voltage values, can be summed. If a predetermined threshold voltage is exceeded, this can be determined as a signal for a motion.

Ultimately, it is not necessary for the proposed evaluation that the evaluation unit or an image acquisition generates 2D-images based on the charge carriers accumulated at the integration nodes Ga, Gb. For the detection of a motion it is sufficient to consider only the charge differences of the integration nodes Ga, Gb of the time-of-flight pixels.

This method can be applied to the entire image sensor or to partial regions of the sensor. Thus, it may in particular be provided to monitor specific critical or preferred areas, so-called regions of interest. It is also possible to apply a sub-sampling mode in which, for example, only every N-th line and/or N-th column is read out. It is also conceivable for highly critical monitoring tasks to increase the clock rate of the image acquisition for example to more than 50 frames per second.

The method can be used with an active or a passive illumination. If a sufficient ambient light is present, motions can be detected even without active illumination.

In the case of an active illumination it can be RF modulated, however, this is not required. It is important to ensure that the active illumination has the same intensity during the first half (A) of the acquisition as during the second half (B) of the acquisition. Otherwise an appropriate calibration has to be carried out.

Figure 9:
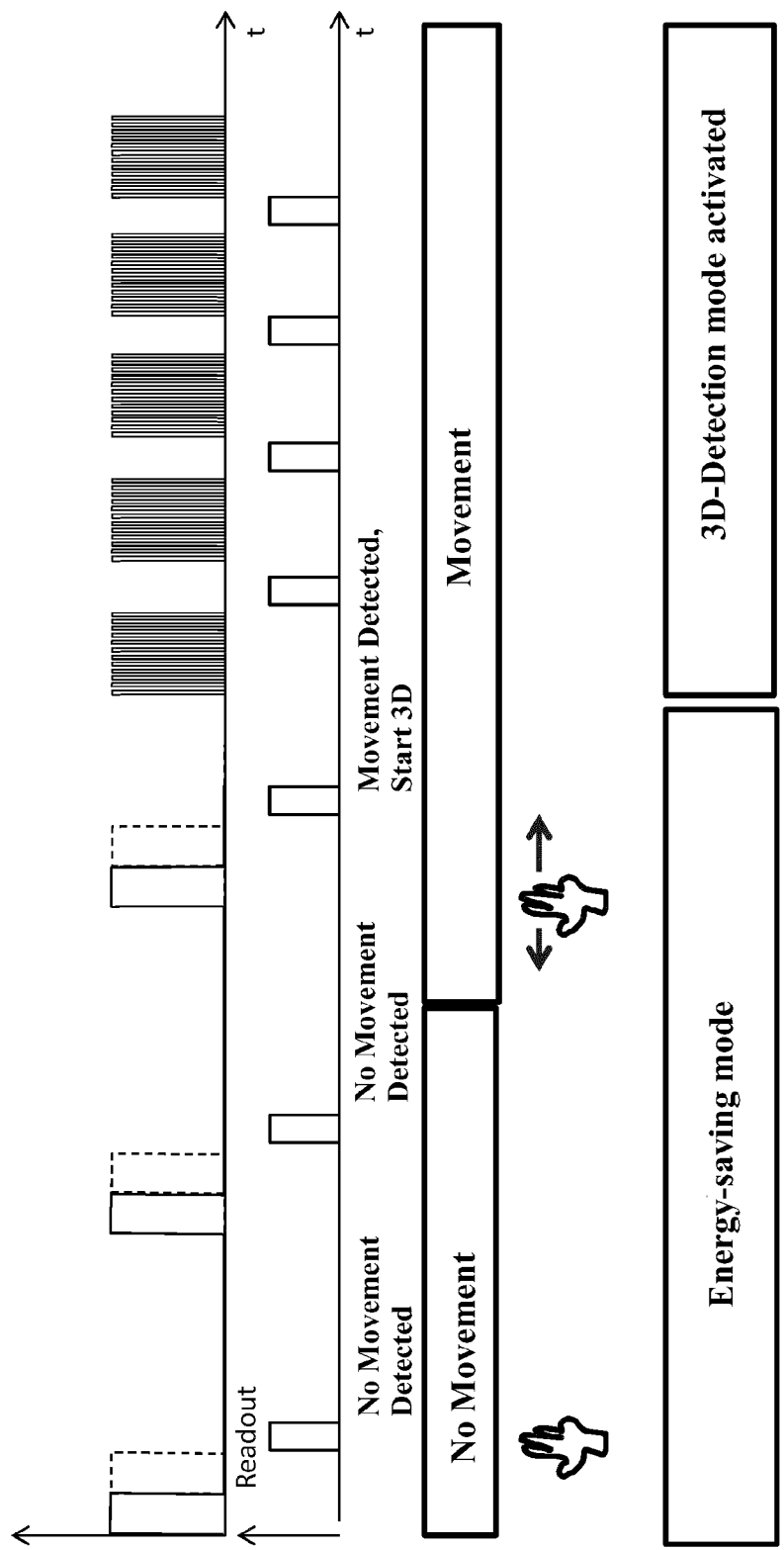
FIG. 9 shows an exemplary embodiment of a time-of-flight camera including a wakeup mode.

One possible application is waking up a 3D camera from a power saving mode or a low power or standby mode into an active mode, for example for applications such as gesture control via a 3D camera in mobile devices. Such an approach is exemplarily shown in FIG. 9. In a power saving mode, the environment is monitored with respect to motions. To this end, for example, the active, modulated illumination means could be deactivated or operated with a lower power, moreover, it may be provided, to operate the measurement intervals in longer intervals than in the normal operation mode. If a gesture is detected the time-of-flight camera switches to a 3D acquisition mode.

Further, it may be provided that, when the 3D camera is not used, i.e. if no activity, gesture, distance variation and the like is detected within a specified time, the 3D camera switches to power saving mode.

In addition to the previously described use of the modulation control an individual control of the readout circuits (reset/hold) for A and B channels can be used in order to capture the differential image.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

REFERENCE NUMERAL LIST

10 Transmission unit
12 Illumination light source
15 Beam shaping optics
20 Receiving unit, TOF camera
22 Time-of-flight sensor
24 Time-of-flight pixels
25 Receiving optics
30 Modulator
40 Object
400 Readout unit
Gam, G0, Gbm Modulation photogate
Ga, Gb Integration nodes
q Charges
qa, qb Charges at the integration node Ga, Gb

The invention claimed is:

1. A method for operating a time-of-flight camera including a time-of-flight sensor comprising an array of time-of-flight pixels with at least two integration nodes, wherein in a 3D mode the time-of-flight sensor and an illumination means are operated by means of a modulation signal and on the basis of the charges accumulated at the integration nodes distance values are determined;
   wherein in a power saving mode the time-of-flight sensor is operated for motion detection with a control signal, wherein each of the at least two integration nodes are triggered by means of the control signal and wherein the frequency of the control signal is lower than a lowest frequency of the modulation signal for a distance determination in the 3D mode,
   wherein an object motion is determined based on a differential value at the at least two integration nodes.

2. The method according to claim 1, wherein in the power saving mode, the differential value is compared with a threshold value and, if the threshold value is exceeded, this is identified as an object motion.

3. The method according to claim 1, wherein the power saving mode is switched to the 3D mode as soon as an object motion is identified in a power saving mode.

4. The method according to claim 1, wherein in the power saving mode the detection of the differential values is performed with a lower acquisition rate compared to the 3D mode.

5. The method according to claim 1, wherein in the power saving mode the frequency of the control signal is less than 10% of the lowest frequency of the modulation signal used for the distance determination in the 3D mode.

6. A time-of-flight camera comprising a time-of-flight sensor including an array of time-of-flight pixels comprising at least two integration nodes, wherein the time-of-flight camera is configured such that in a 3D mode a modulator provides a modulation signal based on which an illumination means emits modulated light and the time-of-flight sensor demodulates detected light for determining a distance value;
   wherein the time-of-flight camera is configured to carry out a method according to claim 1.

7. The method according to claim 1, wherein each of the at least two integration nodes is triggered only once within an acquisition period.

* * * * *